(12) United States Patent
Masuda et al.

(10) Patent No.: US 9,749,489 B2
(45) Date of Patent: Aug. 29, 2017

(54) POWER CONTROL DEVICE AND IMAGE FORMING DEVICE

(71) Applicant: KONICA MINOLTA, INC., Chiyoda-ku, Tokyo (JP)

(72) Inventors: Junichi Masuda, Toyokawa (JP); Mikiyuki Aoki, Toyohashi (JP); Masahiro Nonoyama, Toyokama (JP); Taku Kimura, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/135,766

(22) Filed: Apr. 22, 2016

(65) Prior Publication Data

US 2016/0337539 A1    Nov. 17, 2016

(30) Foreign Application Priority Data

May 12, 2015    (JP) .................................. 2015-097436

(51) Int. Cl.
*H04N 1/00*    (2006.01)
*H02M 7/00*    (2006.01)
(Continued)

(52) U.S. Cl.
CPC .......... *H04N 1/00888* (2013.01); *H02J 5/00* (2013.01); *H02M 3/156* (2013.01); *H02M 3/33507* (2013.01); *H02M 7/00* (2013.01); *H02M 7/06* (2013.01); *H04N 1/00899* (2013.01); *H02M 2001/0006* (2013.01); *H02M 2001/007* (2013.01); *H04N 2201/0094* (2013.01)

(58) Field of Classification Search
None
See application file for complete search history.

(56) References Cited

U.S. PATENT DOCUMENTS 5,959,432 A  *   9/1999 Saurer ...................... H02J 7/35
                                                    320/101
2002/0131788 A1*  9/2002 Nakaya .................. G03G 15/80
                                                    399/88

(Continued)

FOREIGN PATENT DOCUMENTS

JP    2002-359970 A    12/2002
JP    2011-097736 A    5/2011

*Primary Examiner* — Ming Hon
(74) *Attorney, Agent, or Firm* — Buchanan Ingersoll & Rooney PC

(57) ABSTRACT

A power control device receiving supply of power from a power source, the power control device including: a power accumulator accumulating a part of power from the power source; a first voltage converter receiving power from the power source and the power accumulator, performing voltage conversion to a first target voltage, and supplying power with the first target voltage to a first load; a second voltage converter receiving power from the first voltage converter, performing voltage conversion to a second target voltage, and supplying power with the second target voltage to a second load; a power source monitor monitoring power from the power source; and a power controller lowering the first target voltage to a level that the second voltage converter is capable of converting to the second target voltage when the power source monitor detects that the supply of power from the power source has stopped.

12 Claims, 12 Drawing Sheets

(51) Int. Cl.
*H02M 3/156* (2006.01)
*H02J 5/00* (2016.01)
*H02M 3/335* (2006.01)
*H02M 7/06* (2006.01)
*H02M 1/00* (2006.01)

(56) References Cited

U.S. PATENT DOCUMENTS

| | | | |
|---|---|---|---|
| 2007/0201894 A1* | 8/2007 | Kishi | G03G 15/5004 399/88 |
| 2010/0080057 A1* | 4/2010 | Reuter | G11C 5/143 365/185.04 |
| 2013/0214606 A1* | 8/2013 | Hasebe | G03G 15/5004 307/80 |
| 2014/0176975 A1* | 6/2014 | Kobayashi | G03G 15/5004 358/1.13 |
| 2015/0009516 A1* | 1/2015 | Choi | G03G 15/5004 358/1.13 |
| 2016/0131686 A1* | 5/2016 | Handley | G01R 21/007 324/76.11 |
| 2016/0231686 A1* | 8/2016 | Itoh | G03G 15/5016 |

\* cited by examiner

FIG. 4A
PRIOR ART
Conventional technology

- AC input
- Driving power — 24V, Operation stop voltage, 0V
- Control power — 5V, Reset voltage, 0V
- AC input signal — On / Off
- Reset signal — On / Off One cycle | Backup period
Stop of AC Power supply FIG. 4B
Embodiment 1

- AC input
- Driving power — 24V, Operation stop voltage, 0V
- Control power — 5V, Reset voltage, 0V
- AC input signal — On / Off
- Reset signal — On / Off One cycle | Backup period
Stop of AC Power supply

POWER CONTROL DEVICE AND IMAGE FORMING DEVICE

This application is based on an application No. 2015-097436 filed in Japan, the contents of which are hereby incorporated by reference.

BACKGROUND OF DISCLOSURE (1) Technical Field

The present disclosure is related to a power control device and an image forming device. In particular, the present disclosure is related to a technology for supplying power required for data backup that is executed when power supply from a main power source stops, over an increased amount of time with a cost-efficient device structure.

(2) Description of the Related Art

Recently, a typical image forming device has a built-in computer system that executes various types of digital processing. When power supply to such an image forming device stops during digital processing, data loss may occur. One measure for preventing such data loss is to execute data backup involving evacuating data from a volatile memory to a non-volatile memory when stop of power supply is detected.

Further, the amount of digital data that a typical image forming device processes is increasing non-stop, with the increase in printing speed, image definition, and the like. Consequently, the amount of data that an image forming device needs to backup upon stop of power supply is also on the increase. This has led to an increase in the amount of power required to be supplied to an image forming device for executing data backup.

Meanwhile, a typical image forming device has a built-in power control device. Further, when power supply to the image forming device from a main power source stops, the image forming device typically executes data backup by using power accumulated in a smoothing capacitor provided to an AC/DC converter included in the power control device. Accordingly, one possible measure for securing that enough power for data backup is supplied to the image forming device is using a large-capacity electrolytic capacitor as the smoothing capacitor of the AC/DC converter.

SUMMARY OF DISCLOSURE

However, a large-capacity electrolytic capacitor is typically both expensive and large. Thus, using such an electrolytic capacitor brings about problems such as an increase in both overall cost and overall size of an image forming device.

In view of this, the present disclosure provides a power control device that is capable of supplying power required for data backup that is executed when power supply from a main power source stops, over an increased amount of time with a cost-efficient device structure, and an image forming device including such a power control device.

BRIEF DESCRIPTION OF THE DRAWINGS

These and the other objects, advantages and features of the technology pertaining to the present disclosure will become apparent from the following description thereof taken in conjunction with the accompanying drawings which illustrate a specific embodiment of the technology pertaining to the present disclosure.

In the drawings:

FIGS. 4A and 4B are charts illustrating timings of operations executed when power supply from an AC power source stops, with FIG. 4A corresponding to conventional technology and FIG. 4B corresponding to embodiment 1;

DESCRIPTION OF EMBODIMENTS

The following describes embodiments of the power control device and the image forming device pertaining to the present disclosure, with reference to the accompanying drawings.

[1] Embodiment 1

The following describes embodiment 1 of the technology pertaining to the present disclosure.

The power control device pertaining to the present embodiment is included in an image forming device, and supplies power to components of the image forming device.

(1) Structure of Image Forming Device

The following describes the structure of the image forming device pertaining to embodiment 1.

Figure 1:
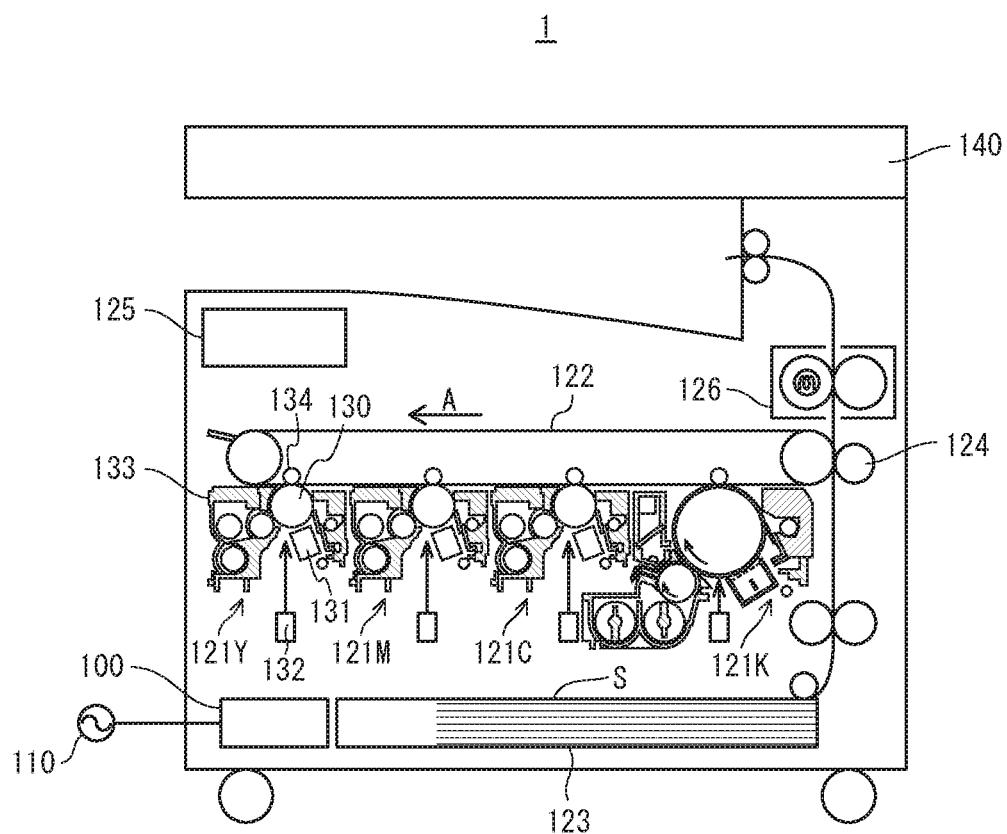
FIG. 1 illustrates the structure of a main part of an image forming device.

FIG. 1 illustrates the structure of a main part of the image forming device pertaining to embodiment 1. The image forming device pertaining to embodiment 1 (image forming device 1) is a so-called tandem-type multi-functional peripheral (MFP). The image forming device 1 includes a power control device 100. The power control device 100 receives alternating current (AC) from an AC power source 110, and supplies direct current (DC) to components included in the image forming device 1.

The image forming device 1 includes an image reader 140. The image reader 140 reads information from a document and generates image data from the information. The image forming device 1 includes a control unit 125 and image formers 121Y, 121M, 121C, 121K respectively corresponding to the colors yellow, magenta, cyan, and black. The control unit 125, when receiving a job, controls the image formers 121Y, 121M, 121C, 121K to form images of the respective colors. The job that the control unit 125 receives may be a copy job triggered by a user, a print job issued from another device, a print job triggered by the reception of a facsimile, etc.

Each of the image formers 121Y, 121M, 121C, and 121K forms an image of a corresponding color as described in the following taking the image former 121Y as an example. The image former 121Y includes: a photoreceptor drum 130; a charger 131; an optical writing device 132; a developer device 133; and a primary transfer roller 134. The charger 131 uniformly charges the outer circumferential surface of the photoreceptor drum 130. The optical writing device 132, controlled by the control unit 125, exposes the outer circumferential surface of the photoreceptor drum 130 to light, and thereby forms an electrostatic latent image on the outer circumferential surface of the photoreceptor drum 130. The developer device 133 supplies the outer circumferential surface of the photoreceptor drum 130 with toner, and thereby develops the electrostatic latent image. The primary transfer roller 134 electrostatically transfers the toner image having been formed on the outer circumferential surface of the photoreceptor drum 130 onto an intermediate transfer belt 122 of the image forming device 1 (primary transfer).

The image formers 121Y, 121M, 121C, and 121K each perform the primary transfer so that the Y toner image, the M toner image, the C toner image, and the K toner image, respectively formed by the image formers 121Y, 121M, 121C, and 121K, are transferred onto the intermediate transfer belt 122 to overlap one another and form a color toner image on the intermediate transfer belt 122. The intermediate transfer belt 122 transports the color toner image to a secondary transfer roller pair 124 of the image forming device 1. In the meantime, a recording sheet S fed from a paper-feeding cassette 123 of the image forming device 1 is also transported to the secondary transfer roller pair 124.

The secondary transfer roller pair 124 electrostatically transfers the color toner image on the intermediate transfer belt 122 onto the recording sheet S (secondary transfer). The recording sheet S carrying the color toner image is transported to a fixing device 126 of the image forming device 1, where the color toner image is heat-fixed to the recording sheet S. Following the heat-fixing, the recording sheet S is discharged from the image forming device 1.

Note that in the image forming device 1, components such as the intermediate transfer belt 122, the secondary transfer roller pair 124, a fixing roller of the fixing device 126, the photoreceptor drum 130, a developer roller of the developing device 133, and the primary transfer roller 134 are driven to rotate by an undepicted driving motor provided to the image forming device 1. Further, the image forming device 1 includes a clutch that engages and disengages power transmission from the driving motor to the respective components. Further, the image forming device 1 may include a solenoid that achieves functions such as the transport of the recording sheet S.

The image forming device 1 further includes a ventilation fan to discharge heat from the fixing device 126, etc., to the outside. The ventilation fan discharges air inside the image forming device 1 to the outside.

The control unit 125 includes a control circuit board that is connected to a hard disk drive (HDD) that stores image data. Further, the control unit 125 has the function of providing information to a user of the image forming device 1 and receiving input of instructions from the user of the image forming device 1 via an operation panel (illustrated as O/P 511 in FIG. 3). In addition, the control unit 125 also has, for example, a function of receiving a print job from another device via a network interface card (illustrated as NIC 504 in FIG. 3) that is connectable to a local area network (LAN), and a function of transmitting and receiving facsimile data via an undepicted facsimile communication unit.

Further, the operation panel has a liquid crystal display.

(2) Structure of Power Control Device 100

The following describes the structure of the power control device 100.

Figure 2:
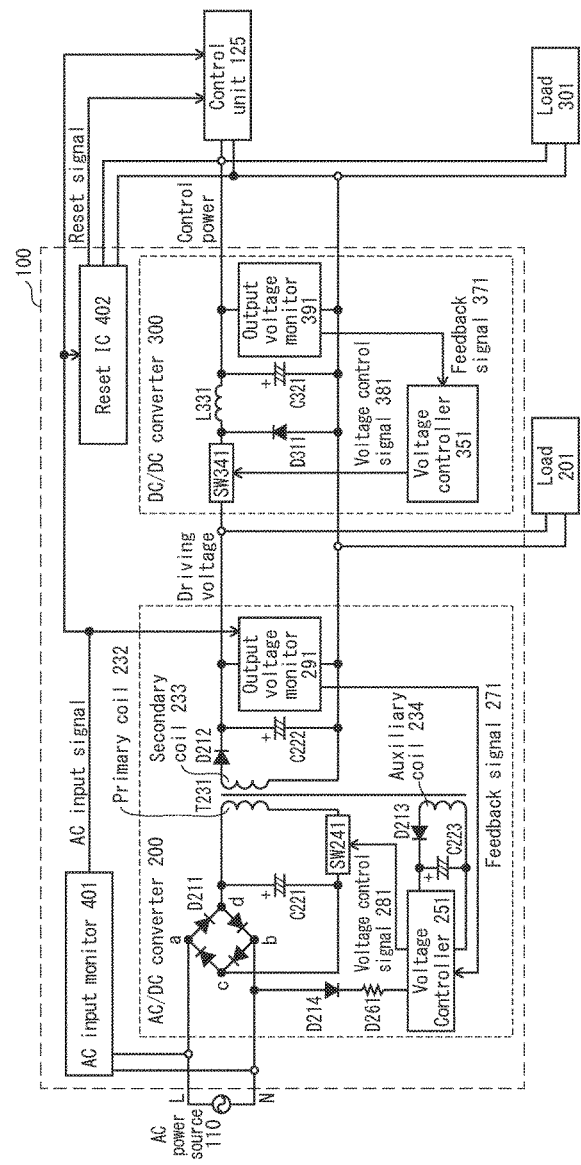
FIG. 2 illustrates the structure of a main part of a power control device 100 in embodiment 1.

As illustrated in FIG. 2, the power control device 100 includes an AC/DC converter 200 and a DC/DC converter 300. The AC/DC converter 200 receives AC power from the AC power source 110 and supplies DC driving power (whose voltage is 24V in embodiment 1) to a load 201 and the DC/DC converter 300. The load 201 is a load related to the drive system of the image forming device 1, and may include a plurality of such loads, for example, the driving motor, the clutch, the solenoid, and the ventilation fan.

The DC/DC converter 300 receives the driving power from the AC/DC converter 200 and supplies control power (whose voltage is 5V in embodiment 1) to the control unit 125 and a load 301. The load 301 may be, for example, a sensor provided to the image forming device 1. Note that the DC/DC converter 300 is a so-called chopper-type DC/DC converter.

The AC/DC converter 200 includes a bridge rectifier circuit D211 and a primary smoothing capacitor C221. The bridge rectifier circuit D211 has a point (indicated as "a" in FIG. 2) connected to the L line of the AC power source 110, and a point (indicated as "b" in FIG. 2) connected to the N line of the AC power source 110. The bridge rectifier circuit D211 performs full-wave rectification of the AC power from the AC power source 110. Further, the bridge rectifier circuit D211 has a point (indicated as "c" in FIG. 2) connected to the cathode of the primary smoothing capacitor C221, and a point (indicated as "d" in FIG. 2) connected to the anode of the primary smoothing capacitor C221. The primary smoothing capacitor C221 smoothens the full-wave rectified power from the bridge rectifier circuit D211. When the primary smoothing capacitor C221 performs this smoothing, power is accumulated in the primary smoothing capacitor C221.

The AC/DC converter 200 further includes a voltage controller 251, a rectifier diode D214, a starting resistor R261, a switch SW241, and a transformer T231. The transformer T231 has a primary coil 232, a secondary coil 233, and an auxiliary coil 234. The voltage controller 251 is a so-called voltage control integrated circuit (IC). The voltage controller 251 receives power necessary for activation from the AC power source 110, due to the activation power terminal of the voltage controller 251 being connected to the N line of the AC power source 110 via the rectifier diode D214 and the starting resistor R261. Further, in order to enable supplying power whose voltage is controlled by the switch SW241 to the secondary coil 233 and the auxiliary coil 234, the serial circuit composed of the primary coil 232 and the switch SW241 is connected in parallel with the primary smoothing capacitor C221.

The AC/DC converter 200 further includes a rectifier diode D213 and a smoothing capacitor C223. The serial circuit composed of the auxiliary coil 234 and the rectifier diode D213 forms a parallel circuit with the smoothing capacitor C223, with the cathode of the rectifier diode D213 connected to the anode of the smoothing capacitor C223. This parallel circuit is connected in parallel to the voltage controller 251. Thus, the voltage controller 251 receives power required for operation thereof from the auxiliary coil 234.

The AC/DC converter 200 further includes a rectifier diode D212, a smoothing capacitor C222, and an output voltage monitor 291. The serial circuit composed of the secondary coil 233 and the rectifier diode D212 forms a parallel circuit with the smoothing capacitor C222, with the cathode of the rectifier diode S212 connected to the anode of the smoothing capacitor 5222. This parallel circuit is connected in parallel to the output voltage monitor 291, which monitors the voltage of the output from this parallel circuit. The output voltage monitor 291 generates a feedback signal 271, and inputs the feedback signal 271 to the feedback terminal of the voltage controller 251. The output voltage monitor 291 generates the feedback signal 271 by comparing the output voltage of the parallel circuit with a voltage value set to the output voltage monitor 291 (referred to as monitor voltage value LA). A different voltage value is set as the monitor voltage value LA depending upon whether a later-described AC input signal is in ON state or OFF state.

The voltage controller 251 outputs a voltage control signal 281 to the switch SW241. The voltage controller 251 changes the voltage control signal 281 depending upon the feedback signal 271. Thus, a PWM (pulse width modulation)-controlled voltage is output from the AC/DC converter 200.

The DC/DC converter 300 includes a switch SW341, a rectifier diode D311, an inductor L331, a smoothing capacitor C321, and an output voltage monitor 391. The DC/DC converter 300 receives driving power from the AC/DC converter 200, with a series circuit formed by the switching SW341 and the rectifier diode D311 being connected in parallel to/across the output terminals of the AC/DC converter 200. The rectifier diode D311 is connected in parallel to a series circuit composed of the inductor L331 and the smoothing capacitor C321. Further, the smoothing capacitor C321 is connected in parallel to the output voltage monitor 391. Having such a structure, the DC/DC converter 300 outputs control power.

The DC/DC converter 300 further includes a voltage controller 351. The output voltage monitor 391 monitors the voltage of the output from the DC/DC converter 300 (i.e., the voltage of the control power). Further, the output voltage monitor 391 generates a feedback signal 371, and inputs the feedback signal 371 to the feedback terminal of the voltage controller 351. The output voltage monitor 391 generates the feedback signal 371 by comparing the output voltage of the DC/DC converter 300 with a voltage value set to the output voltage monitor 391 (referred to as monitor voltage value LB). The voltage controller 351 outputs a voltage control signal 381 to the switch SW341. The voltage controller 351 changes the voltage control signal 381 depending upon the feedback signal 371. Thus, the voltage of the output from the DC/DC converter 300 is subjected to control.

The power control device 100 includes an AC input monitor 401. The AC input monitor 401 monitors the input of AC power from the AC power source 110, and outputs the AC input signal. The AC input signal has two states, one being the ON state corresponding to when AC power is being input from the AC power source 110, and the other being the OFF state corresponding to when AC power is not being input from the AC power source 110.

The power control device 100 further includes a reset IC 402. The reset IC 402 monitors the control power output from the DC/DC converter 300, and inputs a reset signal to the control unit 125. The reset signal has two states, one being an ON state that does not reset the control unit 125 and the other being an OFF state that resets the control unit 125. When the voltage of the control power equals or falls below a predetermined reset voltage, the reset IC 402 switches the reset signal to OFF state and the control unit 125 is reset.

(3) Structure of Control Unit 125

The following describes the structure of the control unit 125.

Figure 3:
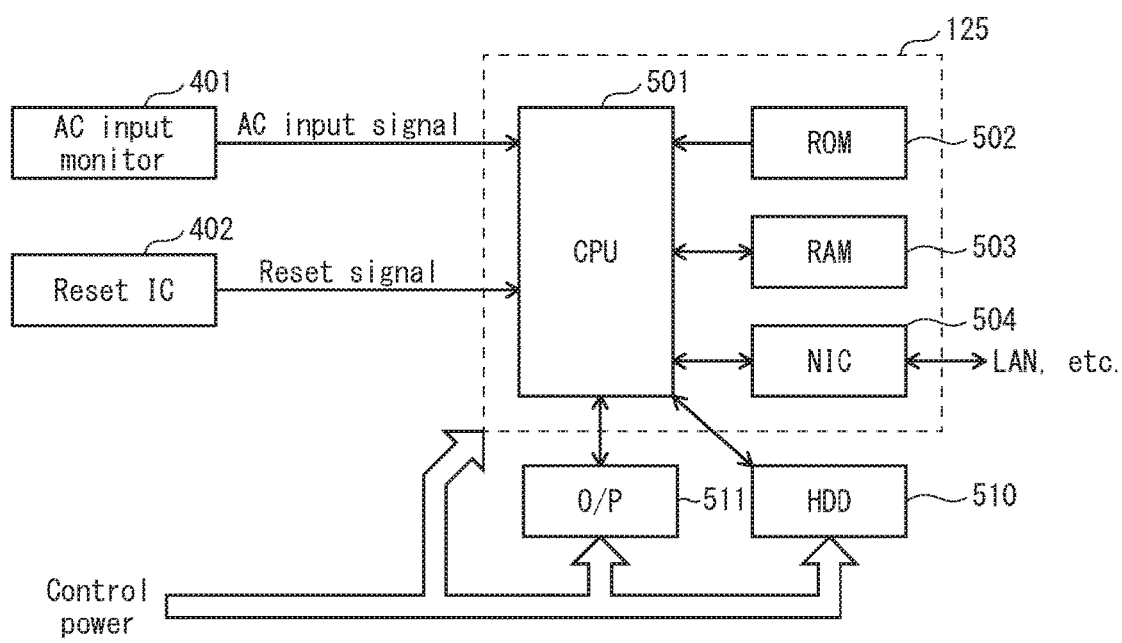
FIG. 3 illustrates the structure of a main part of a control unit 125 in embodiment 1.

As illustrated in FIG. 3, the control unit 125 includes a central processing unit (CPU) 501, a Read Only Memory (ROM) 502, a Random Access Memory (RAM) 503, and the NIC 504. The CPU 501, when the image forming device 1 is turned on, reads out a boot program from the ROM 502 and launches the boot program. Further, the CPU 501 reads programs such as an operating system (OS) from a HDD 510, and executes the programs while using the RAM 503 as a working memory.

In addition, the CPU 501 receives a print job from another device over the LAN by using the NIC 504. Further, the CPU 501 is capable of performing data backup of evacuating digital data on the RAM 503 to the HDD 510. Needless to say, backup destination of the digital data on the RAM 503 need not be the HDD 510, and may be another writable non-volatile memory.

The O/P 511 includes a touch panel implemented by using the LCD display, as well as hardware keys. The CPU 501 presents information to the user, receives input of operations from the user, etc., via the O/P 511.

The control unit 125, the HDD 510, and the O/P 511 operate by being supplied with the control power output from the DC/DC converter 300.

Note that the CPU 501 receives the AC input signal from the AC input monitor 401. Further, when the AC input signal switches from the ON state to the OFF state, the CPU 501 performs shutdown processing. The shutdown processing includes data backup of backing-up necessary digital data on the RAM 503 to the HDD 510.

Here, the necessary digital data on the RAM 503, which is backed-up to the HDD 510, refers to data on the RAM 503 that is necessary to resume operation after power supply from the AC power source 110 starts once again. For example, the necessary digital data includes billing information related to the image forming device 1. Further, the CPU 501 receives the reset signal output from the reset IC 402 to the control unit 125. The CPU 501 is reset when the reset signal switches to OFF state.

(4) Operations Executed When Power Supply from AC Power Source Stops

The following describes operations executed when power supply from an AC power source stops, through comparison of operations executed according to conventional technology and operations executed according to the present embodiment.

(4-1) Operations Executed According to Conventional Technology

The following describes operations executed according to conventional technology.

FIG. 4A illustrates the operations executed according to conventional technology. Specifically, according to conventional technology, the AC input monitor 401 switches the AC input signal to OFF state upon elapse of a period equal to or longer than one cycle of the AC power (e.g., 20 milliseconds in the case of 50 Hz AC power) from when power supply from the AC power source stops.

Starting from when power supply from the AC power source stops, the AC/DC converter 200 supplies the power accumulated in the primary smoothing capacitor C221 as driving power. Then, as the primary smoothing capacitor C221 discharges, the voltage across both terminals of the primary smoothing capacitor C221 decreases. Accordingly, the voltage of the driving power from the AC/DC converter 200 also decreases. Subsequently, when the voltage of the driving power from the AC/DC converter 200 decreases to reach a voltage (e.g., 15 V) at which the operation (voltage switching) by the switch SW341 in the DC/DC converter 300 stops (referred to in the following as an operation stop voltage of the DC/DC converter 300), the voltage of the control power begins to decrease.

As described above, the reset IC 402 monitors the control power. When the voltage of the control power equals or falls below the predetermined reset voltage, the reset IC 402 switches the reset signal to OFF state. Accordingly, the control unit 125 is reset.

At the point when the AC input signal switches to the OFF state, the control unit 125 starts the data backup. Here, it should be noted that the control unit 125 needs to complete the data backup before the reset signal switches to OFF state. Accordingly, the time period allocated to the digital backup (referred to in the following as a back-up period) starts when the AC input signal switches to OFF state and ends when the reset signal switches to the OFF state.

(4-2) Operations Executed according to Present Embodiment

The operations executed according to the present embodiment differ from the operations executed according to the conventional technology in that the AC input monitor 401 outputs the AC input signal to the output voltage monitor 291.

The output voltage monitor 291 sets the monitor voltage value LA to 24V while the AC input signal is in ON state, and sets the monitor voltage value LA to 15V, which is the operation stop voltage of the DC/DC converter 300, while the AC input signal is in OFF state. Accordingly, as soon as the AC input monitor 401 switches the AC input signal to OFF state, the driving power from the AC/DC converter 200 drops to 15V.

The following explains why the configuration is made of reducing the voltage of the driving power output from the AC/DC converter 200 and input to the DC/DC converter 300 to 15V when the AC input monitor 401 switches the AC input signal to OFF state. Here, the DC/DC converter 300 is a voltage-dropping DC/DC converter. Typically, the smaller the difference between the voltage input to a voltage-dropping DC/DC converter (denoted as $V_i$) and the voltage output from the voltage-dropping DC/DC converter (denoted as $V_o$), the higher the conversion efficiency η of the voltage-dropping DC/DC converter.

The conversion efficiency η of a voltage-dropping DC/DC converter is expressible according to Equation (1), based on the power input to the voltage-dropping DC/DC converter (denoted as $W_i$) and the power output from the voltage-dropping DC/DC converter (denoted as $W_o$).

$$\eta = W_o/W_i \qquad \text{Equation (1)}$$

Meanwhile, according to the SI system of units, power is expressible according to Equation (2), in which W denotes power in the watt, J denotes energy in the joule, and s denotes time in the second.

$$[W] = [j]/[s] \qquad \text{Equation (2)}$$

Based on Equation (2), the power $W_i$ input to a voltage-dropping DC/DC converter can be expressed according to Equation (3), by using the amount of energy input to the voltage-dropping DC/DC converter (denoted as $E_i$) and the amount of time for which energy is input to the voltage-dropping DC/DC converter (denoted as $t_i$).

$$W_i = E_i/t_i \qquad \text{Equation (3)}$$

Accordingly, based on Equations (1) and (3), the amount of time $t_i$ for which energy is input to a voltage-dropping DC/DC converter can be expressed according to Equation (4), by using the conversion efficiency η of the voltage-dropping DC/DC converter, the power $W_o$ output from the voltage-dropping DC/DC converter, and the amount of energy $E_i$ input to the voltage-dropping DC/DC converter.

$$t_i = \eta E_i/W_o \qquad \text{Equation (4)}$$

Equation (4) indicates that the greater the conversion efficiency η of a voltage-dropping DC/DC converter, the longer the amount of time $t_i$ for which energy is input to the voltage-dropping DC/DC converter.

As already discussed above, the smaller the difference between the voltage $V_i$ input to a voltage-dropping DC/DC converter and the voltage $V_o$ output from the voltage-dropping DC/DC converter, the greater the conversion efficiency η of the voltage-dropping DC/DC converter. This means that in the present embodiment, the smaller the difference (denoted as $V_d$ and expressed according to Equation (5) below) between the voltage of the driving power (denoted as $V_i$) input to the DC/DC converter 300 and the voltage of the control power (denoted as $V_o$) output from the DC/DC converter 300, the higher the conversion efficiency η of the DC/DC converter 300.

$$V_d = V_i - V_o \qquad \text{Equation (5)}$$

This means that by reducing the voltage of the driving power output from the AC/DC converter 200 and input to the DC/DC converter 300 when the AC input monitor 401 switches the AC input signal to OFF state, the conversion efficiency η of the DC/DC converter 300 can be increased and consequently, the backup period can be extended.

More specifically, by making the configuration illustrated in FIG. 4B where the voltage of the driving power output from the AC/DC converter 200 and input to the DC/DC converter 300 is reduced to 15V when the AC input monitor 401 switches the AC input signal to OFF state, the difference $V_d$ between the voltage of the driving power input to the DC/DC converter 300 and the voltage of the control power output from the DC/DC converter 300 decreases. By making such a configuration, the conversion efficiency η of the DC/DC converter 300 becomes higher and the amount of time $t_i$ for which the DC/DC converter 300 supplies the control power with the voltage of 5V becomes longer, compared to when the voltage of the driving power remains to be 24V.

Subsequently, when the voltage of the driving power from the AC/DC converter 200 decreases and falls below the operation stop voltage of the DC/DC converter 300, the control power from the DC/DC converter 300 also decreases and falls below 5V. Then, when the control power decreases and falls below the reset voltage, the reset IC 402 switches the reset signal to the OFF state, and the control unit 125 is reset.

Making such a configuration allows extending the amount of time for which the DC/DC converter 300 supplies control power having a voltage 5V, without having to increase the electrostatic capacity of the primary smoothing capacitor C221. Thus, the backup period secured for the data backup (i.e., evacuating necessary digital data on the ROM 502 to the HDD 504) is sufficiently long even when the digital data has a great size. Accordingly, the above-described configuration eliminates the increase in cost, device size, etc., that would be brought about by increasing the electrostatic capacity of the primary smoothing capacitor C221.

Decreasing the voltage of the driving power from the AC/DC converter 200 results in an increase in the amount of charge discharged from the primary smoothing capacitor C221. Decreasing the voltage of the driving power from the AC/DC converter 200 also contributes to the extension of the time period for which the DC/DC converter 300 supplies control power having a voltage 5V in this sense, in addition to what is described above.

Further, in the present embodiment, the AC input signal is directly input to the output voltage monitor 291 without any software processing. Thus, the decrease in the voltage of the driving power from the AC/DC converter 200 can be achieved quickly, which means that the conversion efficiency η of the DC/DC converter 300 can be increased quickly. Thus, it can be said that making a configuration such that the AC input signal is directly input to the output voltage monitor 291 without any software processing contributes to extending the backup period by preventing the power accumulated in the primary smoothing capacitor C221 from being wasted.

Meanwhile, decreasing the voltage of the driving power from the AC/DC converter 200 increases the difference between the voltage input to the AC/DC converter 200 and the voltage output from the AC/DC converter 200, and a consequent decrease in the conversion efficiency of the AC/DC converter 200. That is, it can be said that when the conversion efficiency η of the DC/DC converter 300 (which achieves the extension in backup period) increases, the conversion efficiency of the AC/DC converter 200 decreases, and vice versa. Taking this into consideration, the voltage of the driving power at the point when power supply from the AC power source 110 stops is to be set so that the overall efficiency of the power control device 100 is highest.

[2] Embodiment 2

The following describes embodiment 2 of the technology pertaining to the present disclosure.

The image forming device pertaining to the present embodiment basically has the same structure as the image forming device pertaining to embodiment 1. However, the two image forming devices differ in terms of the configuration for changing the voltage of the driving power from the AC/DC converter 200. The following provides description focusing on this difference. Meanwhile, in the following, a component common to both embodiments is identified by using the reference sign used in embodiment 1.

(1) Structure of Power Control Device 100 in Embodiment 2

The following describes the structure of the power control device 100 in embodiment 2.

Figure 5:
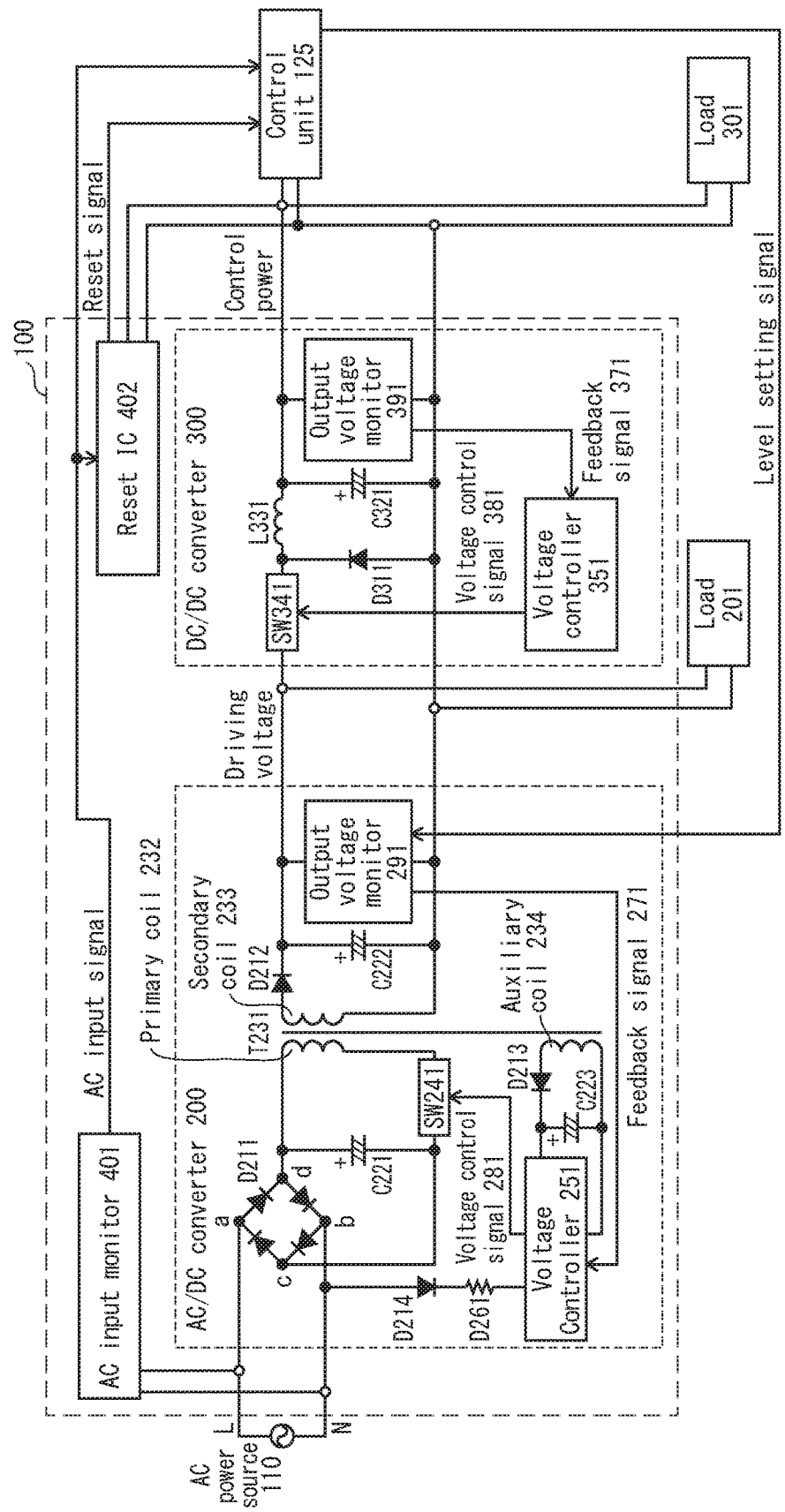
FIG. 5 illustrates the structure of a main part of the power control device 100 in embodiment 2.

In the present embodiment, the power control device 100 has the structure illustrated in FIG. 5. Specifically, the output voltage monitor 291 of the AC/DC converter 200, instead of receiving the AC input signal from the AC input monitor 401, receives a level setting signal from the control unit 125. The level setting signal causes the output voltage monitor 291 to change the monitor voltage value LA.

Specifically, the output voltage monitor 291, when receiving the level setting signal, sets one of the following voltages that is indicated by the level setting signal as the monitor voltage value LA: (i) 24V, which corresponds to the voltage of the driving power in a regular state (i.e., while the AC input signal is in ON state); (ii) 15V, which corresponds to the operation stop voltage of the DC/DC converter 300; and (iii) a voltage between 24V and 15V (referred to in the following as an intermediate voltage, and may be 20V for example).

The structure of the rest of the power control device 100 remains the same in embodiment 2.

(2) Structure of Control Unit 125 in Embodiment 2

The following describes the structure of the control unit 125 in embodiment 2.

Figure 6:
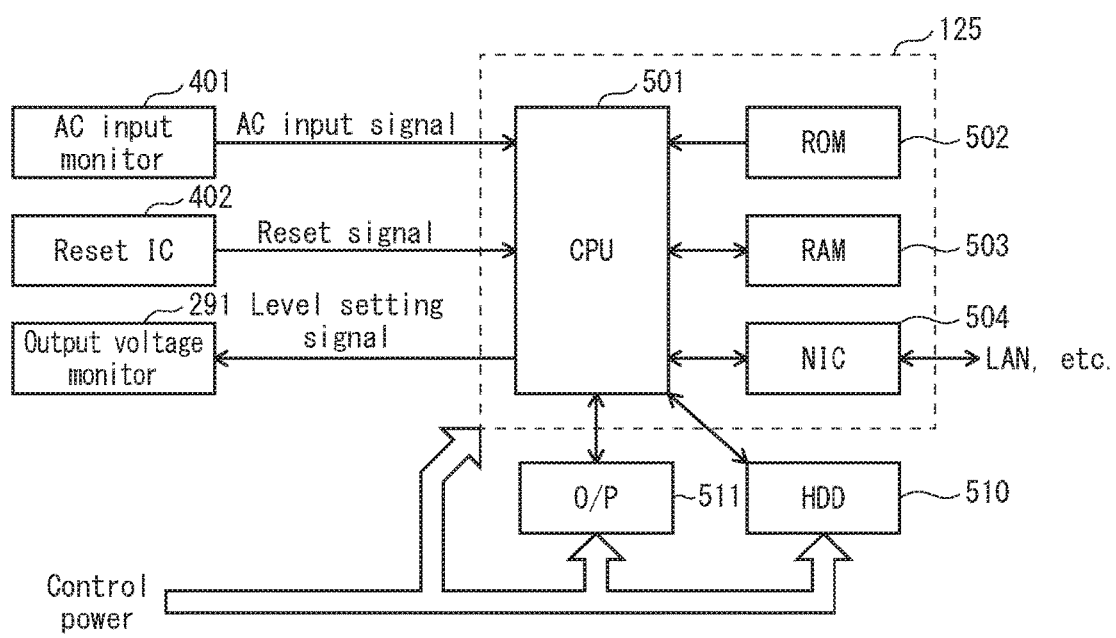
FIG. 6 illustrates the structure of a main part of the control unit 125 in embodiment 2.

The control unit 125 in embodiment 2 has the structure illustrated in FIG. 6. Specifically, the control unit 125 inputs the level setting signal to the output voltage monitor 291. As already described above, the level setting unit causes the output voltage monitor 291 to change the monitor voltage value LA. The level setting signal output during the regular state (i.e., while the AC input signal is in ON state) causes the output voltage monitor 291 to hold the voltage of 24V as the monitor voltage value LA. Meanwhile, the level setting signal output while the AC input signal is in OFF state causes the output voltage monitor 291 to hold, as the monitor voltage value LA, a voltage value that is in accordance with the load state of the image forming device 1.

Here, an assumption is made that the image forming device 1, at a given time point, is in one of two load states, a heavy load state and a light load state. The heavy load state refers to the load state of the image forming device 1 when the image forming device 1 is in either a print mode, a copy mode, or a standby mode. The light load state refers to the load state of the image forming device 1 when the image forming device 1 is in other operations modes, such as a sleep mode.

(3) Operations Executed when Power Supply from AC Power Source Stops

The following describes operations executed when power supply from the AC power source 110 stops.

Figure 7:
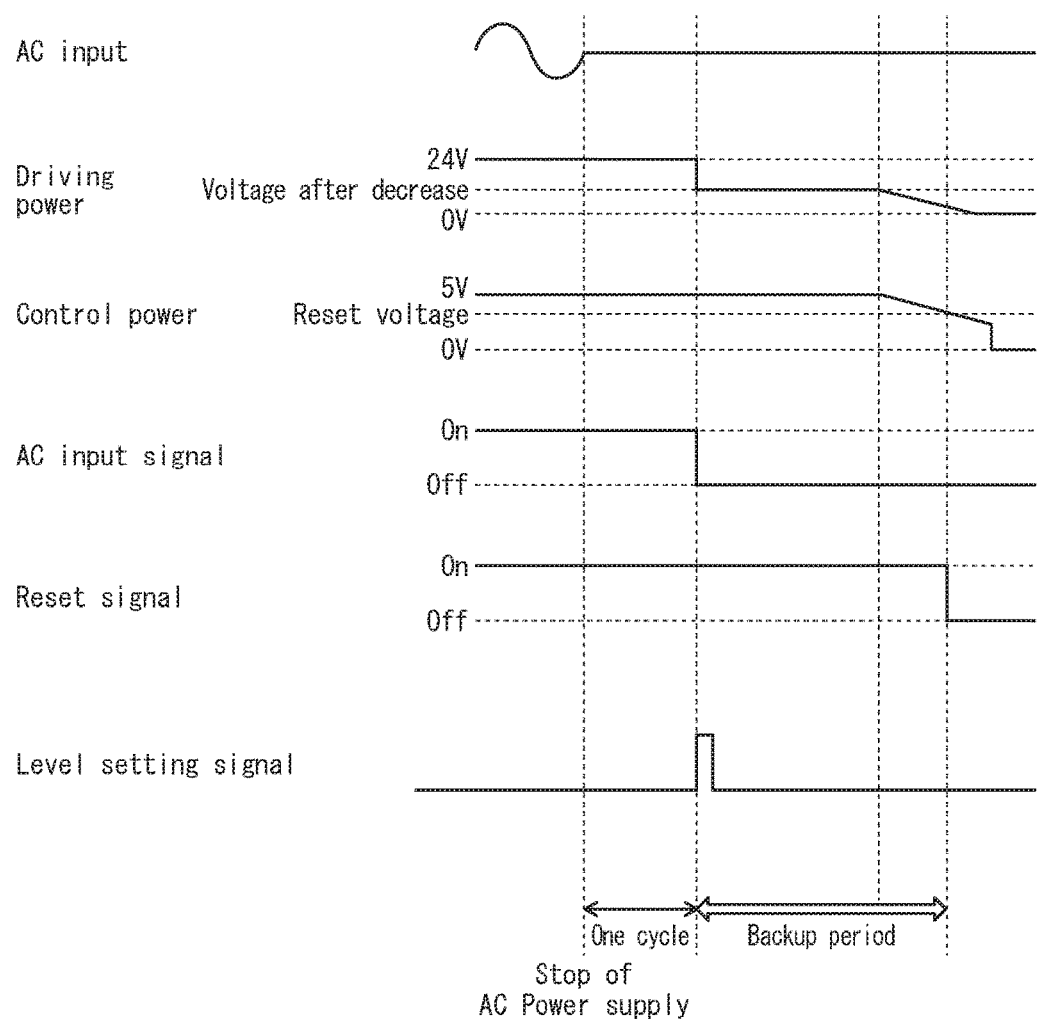
FIG. 7 is a chart illustrating timings of operations executed when power supply from the AC power source stops.
Figure 8:
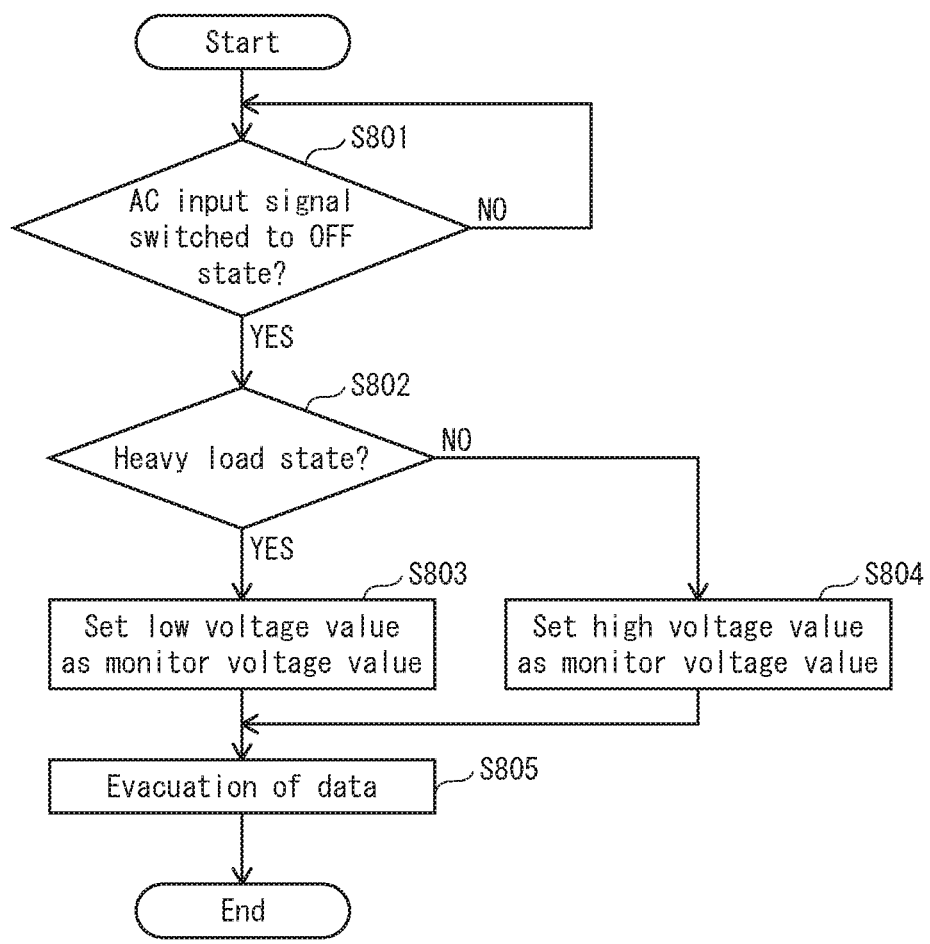
FIG. 8 is a flowchart illustrating main operations of the control unit 125 in embodiment 2.

As illustrated in FIG. 7, the AC input monitor 401 switches the AC input signal to OFF state upon elapse of a period equal to or longer than one cycle of the AC power from when power supply from the AC power source stops. In response to the AC input signal switching to the OFF state (S801: YES), the control unit 125 checks the load state of the image forming device 1, as illustrated in FIG. 8. When the image forming device 1 is in the heavy load state (S802: YES), the control unit 125 causes the output voltage monitor 291 to hold a relatively low voltage value as the monitor voltage value LA (S803). Specifically, in the present embodiment, the level setting signal output in this case causes the output voltage monitor 291 to hold, as the monitor voltage value LA, the voltage value corresponding to the operation stop voltage of the DC/DC converter 300.

Meanwhile, when the image forming device 1 is in the light load state (S802: NO), the control unit 125 causes the output voltage monitor 291 to hold a relatively high voltage value as the monitor voltage value LA (S804). Specifically, in the present embodiment, the level setting signal output in this case causes the output voltage monitor 291 to hold, as the monitor voltage value LA, the intermediate voltage value, which is higher than the operation stop voltage of the DC/DC converter 300.

In either case, following this, the voltage of the driving power from the AC/DC converter 200 decreases to reach the monitor voltage value LA held by the output voltage monitor 291.

Making such a configuration allows extending the backup period, without having to increase the electrostatic capacity of the primary smoothing capacitor C221, similar to the configuration of embodiment 1 described above.

Further, it should be noted that in the light load state, the image forming device 1 consumes relatively low driving power and control power. Due to this, decreasing the voltage of the driving power to the operation stop voltage of the DC/DC converter 300 similar to when the image forming device 1 is in the heavy load state, regardless of the image forming device being in the light load state, results in the power accumulated in the primary smoothing capacitor S221 not being sufficiently consumed yet at the point when the evacuation of digital data is completed. Thus, there is a risk of the decrease of the voltage of the driving power not being completed in a timely manner, or in other words, the risk of the backup period being extended unnecessarily.

Specifically, if the AC power source 110 should resume power supply before the control unit 125 is reset due to this unnecessary extension of the backup period, the driving power would remain having the monitor voltage value held by the output voltage monitor 291. This results in the voltage of the control power not decreasing to reach the reset voltage, and consequently, the reset IC 402 would not switch the reset signal to OFF state. Meanwhile, after completing the backup processing, the control unit 125 would wait to be reset, or in other words, the control unit 125 would wait for the reset signal to be switched to OFF state. When such a situation occurs, the image forming device 1 would not be able to resume normal operation.

In order to prevent this problem from occurring, the monitor voltage value LA of the output voltage monitor 291 is set to the intermediate voltage, which is higher than the operation stop voltage of the DC/DC converter 300, when the image forming device 1 is in the light load state. Accordingly, the power accumulated in the primary smoothing capacitor C221 is consumed in a timely manner even when the image forming device 1 is in the light load state, and thus, an unnecessary extension of the backup period is prevented.

Further, making the configuration described above eliminates the necessity of storing different voltage values that are to be set as the monitor voltage value LA and that correspond to the ON state and the OFF state of the AC input signal. This leads to a reduction in circuit scale of the power control device 100, and a consequent reduction in parts cost and manufacturing cost of the power control device 100.

[3] Modifications

In the above, description is provided of the technology pertaining to the present disclosure based on embodiments thereof. Needless to say, the technology pertaining to the present disclosure shall not be construed as being limited in any way to the embodiments, and rather, shall be construed as covering various modification, such as those described in the following.

(1) In the embodiments, the DC/DC converter 300 supplying the control power, whose voltage is 5V, is the only converter receiving the driving power from the AC/DC converter 200.

Figure 9:
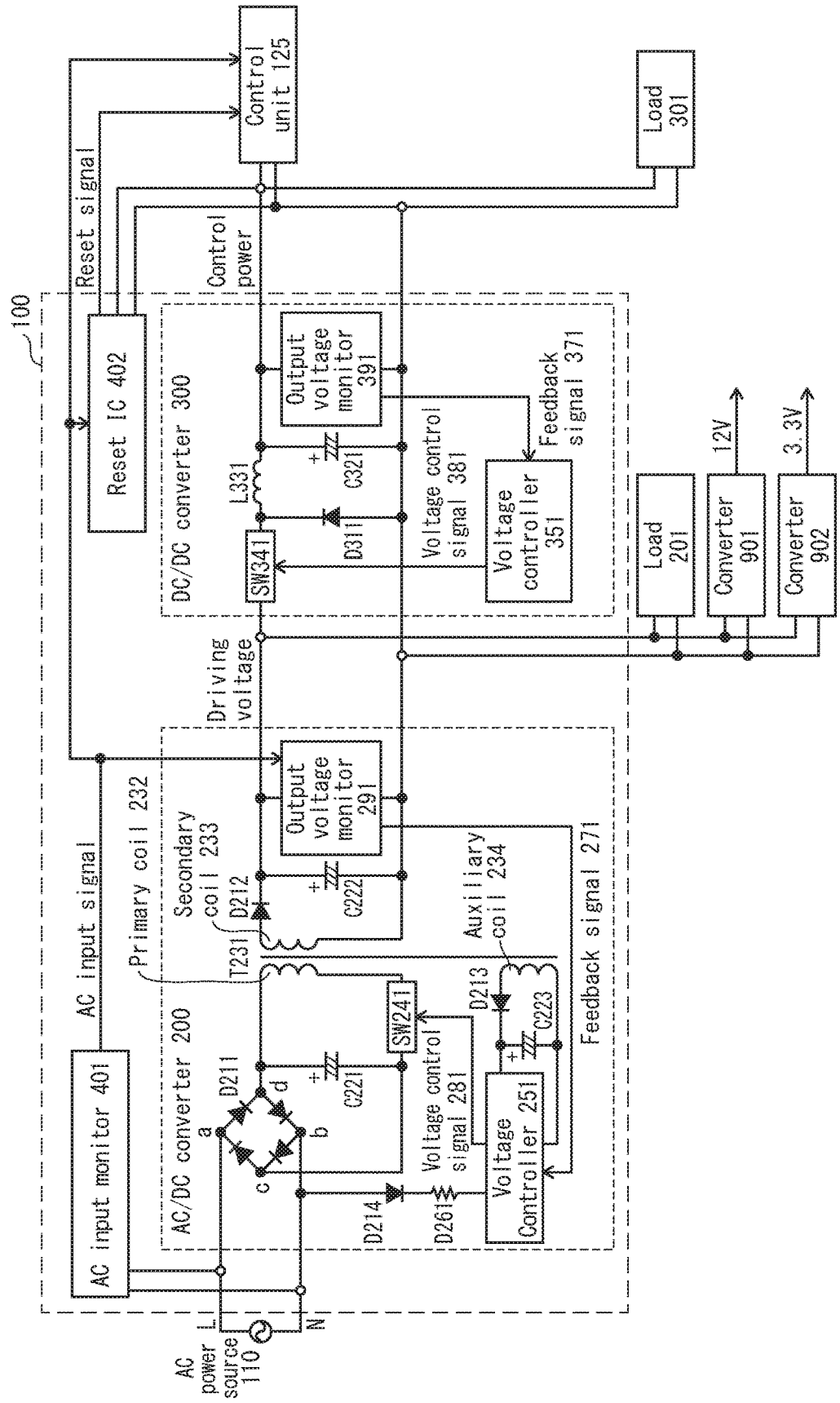
FIG. 9 illustrates the structure of a main part of the power control device 100 in a modification.

However, additional converters may be connected to the power control device 100 to also receive the driving power from the AC/DC converter 200. For example, as illustrated in FIG. 9, a DC/DC converter 901 supplying power with a voltage of 12V and a DC/DC converter 902 supplying power with a voltage of 3.3V may be connected to the power control device 100 to also receive the driving power from the AC/DC converter 200. Further, each of the DC/DC converters 901, 902 may supply power to a load such as a sensor or the like.

Even if one or more such additional converters receiving the driving power from the AC/DC converter 200 (e.g., DC/DC converters 901, 902 in FIG. 9) are connected to the power control device 100, decreasing the voltage of the driving power to a voltage with which the DC/DC converter 300 is capable of operating when the AC input signal is switched to the OFF state achieves the above-described extension in the backup period, and thus increases the reliability of the data backup of the digital data on the RAM 503.

(2) In the embodiments, the driving power continues to be supplied to the load 201 (i.e., one or more loads related to the drive system of the image forming device 1) even after the power supply from the AC power source 110 stops.

Figure 10:
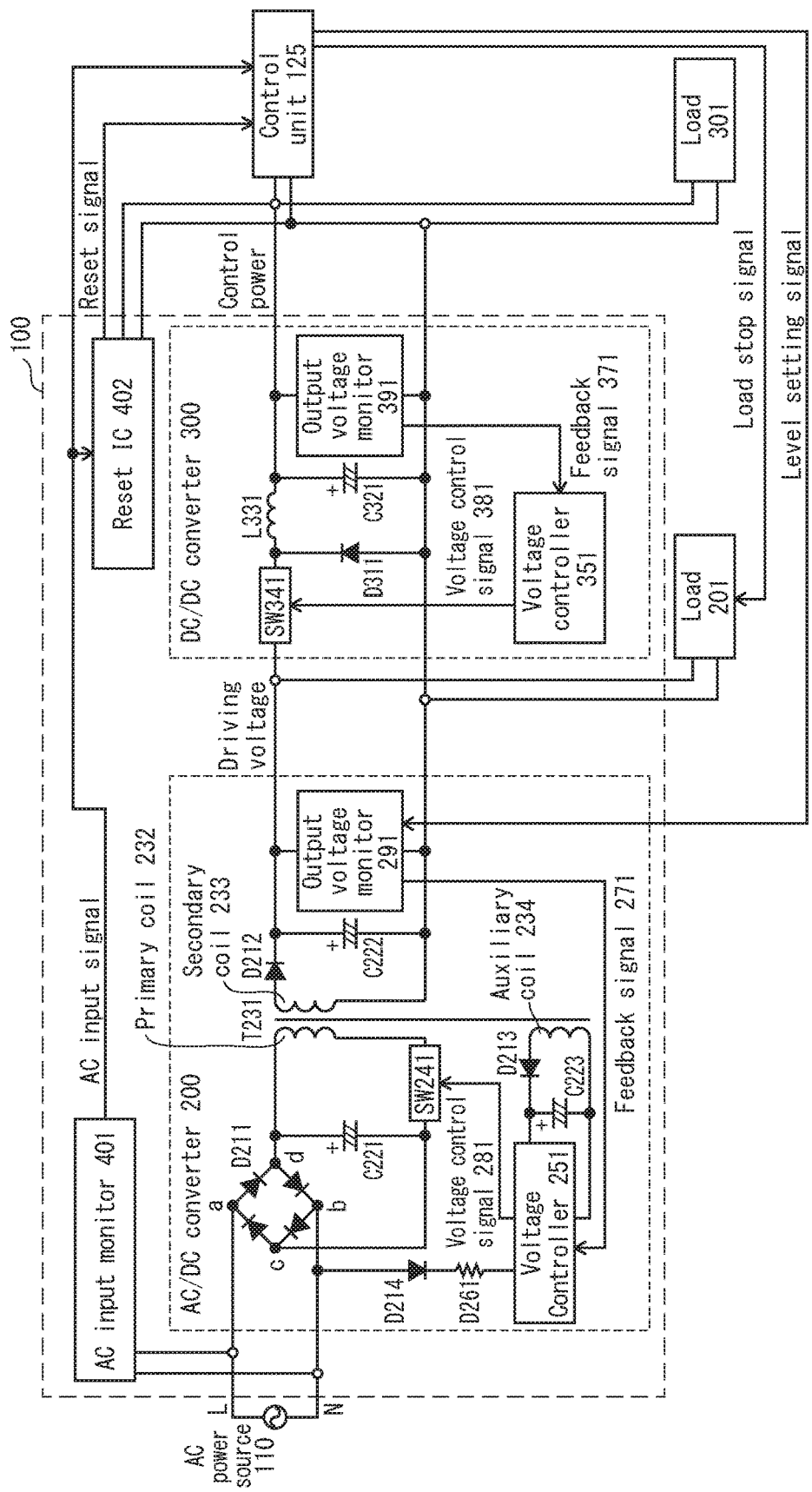
FIG. 10 illustrates the structure of a main part of the power control device 100 in a modification.

However, a modification may be made as illustrated in FIG. 10, where the control unit 125 outputs, to the load 201, a load stop signal causing the load 201 to stop when the AC input signal is switched to the OFF state. This modification reduces consumption of the driving power. Specifically, this modification reduces the consumption of the power accumulated in the primary smoothing capacitor C221, due to the driving power only being supplied to the DC/DC converter 300 from the point when the power supply from the AC power source 110 stops, and thus achieves a further extension of the backup period.

Figure 11:
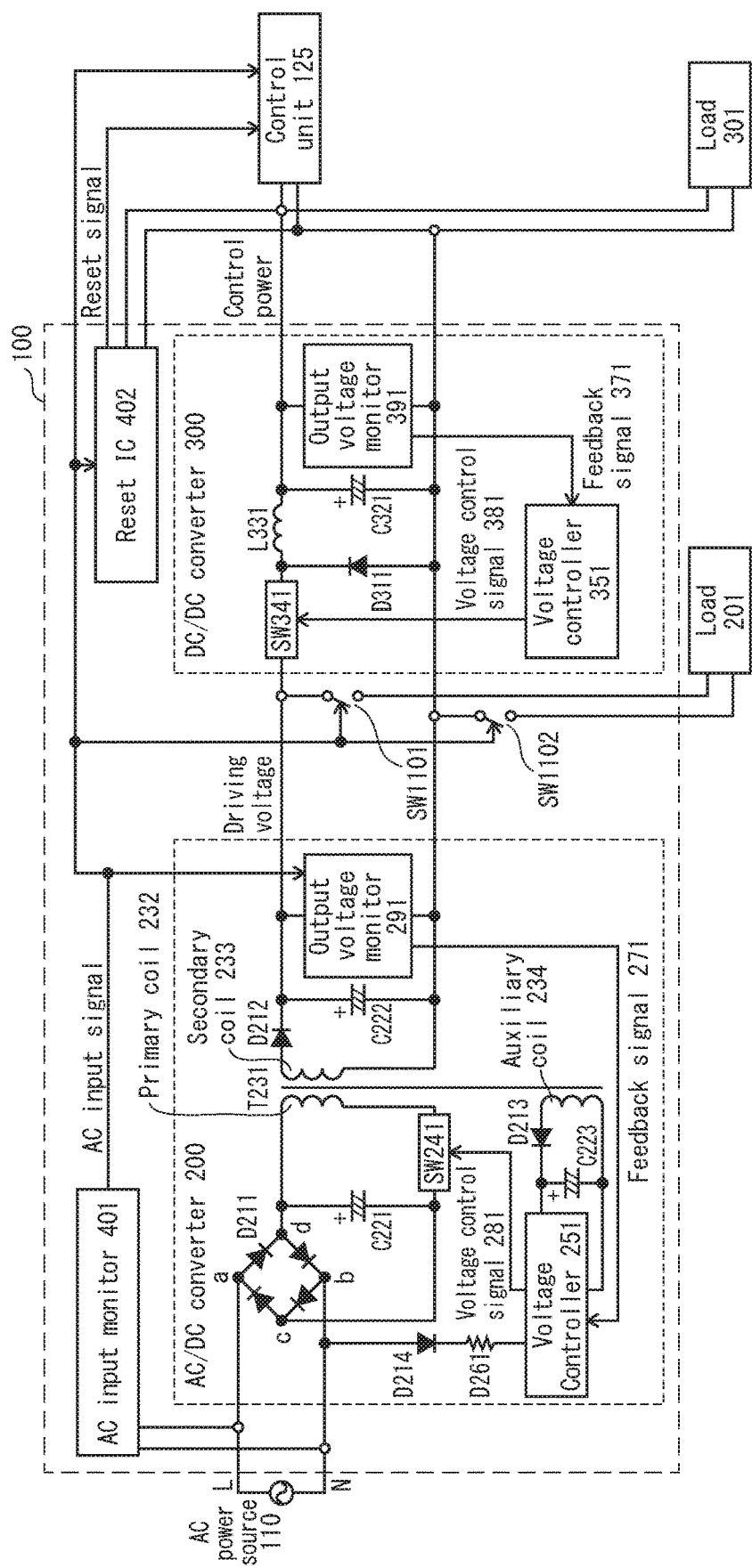
FIG. 11 illustrates the structure of a main part of the power control device 100 in a modification.

Alternatively, a modification may be made such that the switching of the AC input signal from the ON state to the OFF state directly stops the supply of the driving power to the load 201. Specifically, a modification may be made as illustrated in FIG. 11, where a pair of switches 1101, 1102 is disposed along the circuit supplying the driving power to the load 201, and the switches 1101, 1102 are controlled to supply the driving power to the load 201 when the AC input signal is in ON state and to stop the supply of the driving power to the load 201 when the AC input signal is switched to the OFF state.

Making this modification achieves stopping the supply of the driving power to the load 201 without any software processing, and thus achieves a further extension of the backup period.

Further, the modification illustrated in FIG. 10 may be further modified, such that the load 201 are caused to stop not at the point when the AC input signal is switched to OFF state but after any recording sheet that is being transported inside the image forming device 1 is ejected from the image forming device 1. Making this modification achieves an additional effect of preventing any recording sheet from remaining in the image forming device 1 after the power supply from the AC power source 110 stops, as compared to the modification of opening the switches 1101, 1102 at the point when the AC input signal is switched to OFF state.

(3) In the embodiments, the voltage of the driving power is decreased after the stop of power supply from the AC power source 110 is detected.

Figure 12:
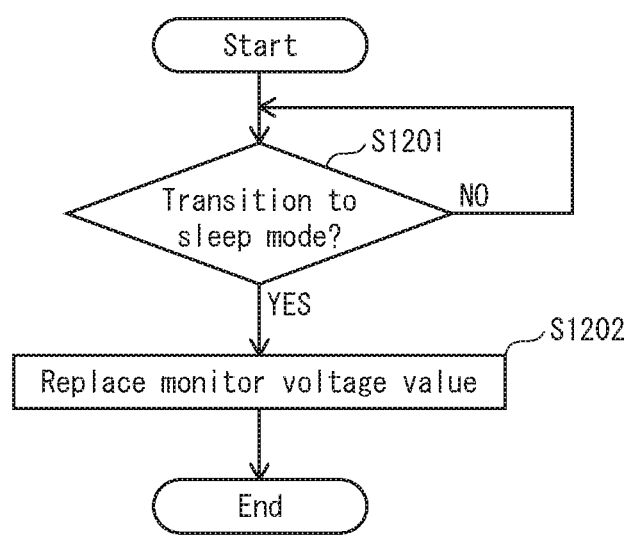
FIG. 12 is a flowchart illustrating main operations of the control unit 125 in a modification.

However, a modification may be made as illustrated in FIG. 12. Specifically, a modification may be made such that, even if power is being supplied from the AC power source 110, the voltage value held by the output voltage monitor 291 as the monitor voltage value LA is replaced with another lower voltage value (S1202) (e.g., the operation stop voltage of the DC/DC converter 300) in response to the transition of the image forming device 1 from another operation mode to the sleep mode (S1201: YES).

According to this modification, the voltage of the driving power is decreased when the image forming device 1 enters the sleep mode, and thus, before the image power supply from the AC power source 110 stops. This modification can be made since when the image forming device 1 enters the sleep mode, the supply of the driving power to the load 201 is unnecessary.

(4) In the embodiments, description is provided of a case where the power supply from the AC power source 110 stops. Meanwhile, after power supply from the AC power source 110 starts once again, the AC input monitor 401 may switch the AC input signal to ON state, which causes the AC/DC converter 200 to return to supplying the driving power with the voltage of 24V. Making this configuration ensures that both the driving power and the control power are supplied to the image forming device 1 normally and thus the image forming device 1 resumes regular operation, when power supply from the AC power source 110 starts once again.

(5) In the embodiments, the shutdown processing that the CPU 501 executes when the power supply from the AC power source 110 stops and the AC input signal input to CPU 501 switches to the OFF state includes the data backup. Needless to say, the shutdown processing includes other types of processing, such as cutting off of the image forming device 1 from the network and from peripheral devices. Taking this into consideration, beneficially, the backup period has a duration allowing not only the data backup to be completed but also allowing every other type of processing included in the shutdown processing to be completed.

(6) In embodiment 2, a different voltage value is set to the monitor voltage value LA of the AC/DC converter 200 depending upon whether the image forming device 1 is in the light load state or the heavy load state.

However, a modification may be made such that, when the AC input signal is switched to the OFF state, the control unit 125 calculates a value indicating the power consumption by the image forming device 1, and sets, to the monitor voltage level LA of the output voltage monitor 291, a voltage value that is in accordance with the power consumption value so calculated. When making this modification, the control unit 125 may have stored therein a table enabling specifying a voltage value to be set to the monitor voltage value LA based on the power consumption value. Alternatively, the control unit 125 may have stored therein a calculation formula enabling calculating voltage value to be set to the monitor voltage value LA based on the power consumption value.

Further, when making this modification, the control unit 125 may have stored therein a table containing a power consumption value for each operation mode of the image forming device 1, and may read out a power consumption value from such a table when the AC input signal is switched to OFF state.

(7) In the embodiments, the AC/DC converter 200 supplies the driving power. However, the AC/DC converter 200 may be replaced with a DC/DC converter that supplies the driving power. When making this modification, an AC/DC converter is connected between the AC power supply 110 and the DC/DC converter that supplies driving power, and shutdown processing including the data backup is executed by using power accumulated in a primary smoothing capacitor of the AC/DC converter.

(8) In the embodiments, the reset IC 402 is included in the power control device 100. However, the technology pertaining to the present disclosure achieves its effects even if the reset IC 402 is provided external to the power control device 100.

(9) In the embodiments, the image forming device 1 is a tandem-type full-color multifunctional peripheral. However, the technology pertaining to the present disclosure is also applicable to full-color multifunctional peripherals not of the tandem-type, as well as to monochromatic multifunctional peripherals. Further, effects similar to those described above can be achieved by applying the technology pertaining to the present disclosure to devices other than multifunction peripherals, such as a printer, a copy machine with a scanner, and a facsimile device with a communication function.

[4] Conclusion

One aspect of the present disclosure is a power control device receiving supply of power from a power source, performing voltage conversion, and supplying loads with power, the power control device including: a power accumulator configured to accumulate a part of power from the power source; a first voltage converter configured to receive power from the power source and the power accumulator, perform voltage conversion to a first target voltage, and supply power with the first target voltage to a first load; a second voltage converter configured to receive power from the first voltage converter, perform voltage conversion to a second target voltage, and supply power with the second target voltage to a second load; a power source monitor configured to monitor power from the power source; and a power controller configured to lower the first target voltage to a level that the second voltage converter is capable of converting to the second target voltage when the power source monitor detects that the supply of power from the power source has stopped.

In the power control device pertaining to one aspect of the present disclosure, when the power source monitor detects that the supply of power from the power source has stopped, the power controller lowers the first target voltage to a level that the second voltage converter is capable of converting to the second target voltage. Thus, compared to when the power controller does not perform the lowering even when the power source monitor detects that the supply of power from the power source has stopped, the amount of time for which the second voltage converter is capable of supplying power with the second target voltage is increased. Thus, the power control device pertaining to one aspect of the present disclosure is capable of supplying power necessary for data backup executed when the supply of power from the power source stops over an increased amount of time, without necessitating an increase in power storage capacity of the power accumulator. Thus, the power control device pertaining to one aspect of the present disclosure is capable of supplying power required for data backup over an increased amount of time with a cost-efficient device structure.

The power control device pertaining to one aspect of the present disclosure may further include a receiver configured to receive specification of a voltage, and in the power control device, when the power source monitor detects that the supply of power from the power source has stopped, the power controller may lower the first target voltage to the voltage whose specification is received by the receiver.

In the power control device pertaining to one aspect of the present disclosure, when the power source monitor detects that the supply of power from the power source has stopped, the power controller may lower the first target voltage to a predetermined level.

The power control device pertaining to one aspect of the present disclosure may further include a prohibitor configured to prohibit the power controller to lower the first target voltage until a predetermined amount of time required for the power source monitor to detect that the supply of power from the power source has stopped elapses.

The power control device pertaining to one aspect of the present disclosure may further include a third voltage converter configured to receive power from the first voltage converter, perform voltage conversion to a third target voltage differing from the second target voltage, and supply power with the third target voltage to a third load, and in the power control device, when the power source monitor detects that the supply of power from the power source has stopped, the power controller may lower the first target voltage to a level that the third voltage converter is not capable of converting to the third target voltage.

In the power control device pertaining to one aspect of the present disclosure, the power controller may restore the first target voltage to an initial level before the lowering when the power source monitor detects that the supply of power from has restarted after having stopped.

One aspect of the present disclosure is an image forming device including: a power control device configured to receive supply of power from a power source, perform voltage conversion, and supply loads with power, the power control device including: a power accumulator configured to accumulate a part of power from the power source; a first voltage converter configured to receive power from the power source and the power accumulator, perform voltage conversion to a first target voltage, and supply power with the first target voltage to a first load; a second voltage converter configured to receive power from the first voltage converter, perform voltage conversion to a second target voltage, and supply power with the second target voltage to a second load; a power source monitor configured to monitor power from the power source; and a power controller configured to lower the first target voltage to a level that the second voltage converter is capable of converting to the second target voltage when the power source monitor detects that the supply of power from the power source has stopped; a volatile memory; a writable non-volatile memory; an evacuator configured to evacuate at least some data stored in the volatile memory to the writable non-volatile memory when the power source monitor detects that the supply of power from the power source has stopped, and in the image forming device, the second load includes a plurality of loads, one of which is the volatile memory.

In the image forming device pertaining to one aspect of the present disclosure, the writable non-volatile memory may be a hard disk.

The image forming device pertaining to one aspect of the present disclosure may further include a stopper configured to stop the supply of power from the first voltage converter to the first load when the power source monitor detects that the supply of power from the power source has stopped, and in the image forming device, the first load may be a load related to a drive system of the image forming device.

One aspect of the present disclosure is an image forming device including: a power control device configured to receive supply of power from a power source, perform voltage conversion, and supply loads with power, the power control device including: a power accumulator configured to accumulate a part of power from the power supply; a first voltage converter configured to receive power from the power source and the power accumulator, perform voltage conversion to a first target voltage, and supply power with the first target voltage to a first load; a second voltage converter configured to receive power from the first voltage converter, perform voltage conversion to a second target voltage, and supply power with the second target voltage to a second load; a power source monitor configured to monitor power from the power source; a power controller configured to lower the first target voltage to a level the second voltage converter is capable of converting to the second target voltage when the power source monitor detects that the supply of power from the power source has stopped; and a receiver configured to receive specification of a voltage; a volatile memory; a writable non-volatile memory; a voltage specifier configured to issue the specification of a voltage in accordance with a power consumption state of the image forming device, when the power source monitor detects that the supply of power from the power source has stopped; an evacuator configured to evacuate at least some data stored in the volatile memory to the writable non-volatile memory when the power source monitor detects that the supply of power from the power source has stopped, and in the image forming device, when the power source monitor detects that the supply of power from the power source has stopped, the power controller lowers the first target voltage to the voltage whose specification is received by the receiver, and the second load includes a plurality of loads, one of which is the volatile memory.

In the image forming device pertaining to one aspect of the present disclosure, the power controller may lower the first target voltage to a level that the second voltage converter is capable of converting to the second target voltage when the first load stops operating, in addition to when the power source monitor detects that the supply of power from the power source has stopped, and the first load may be a load related to a drive system of the image forming device.

Although the technology pertaining to the present disclosure has been fully described by way of examples with reference to the accompanying drawings, it is to be noted that various changes and modifications will be apparent to those skilled in the art.

Therefore, unless otherwise such changes and modifications depart from the scope of the technology pertaining to the present disclosure, they should be construed as being included therein.

What is claimed is:

1. A power control device receiving supply of power from a power source, performing voltage conversion, and supplying loads with power, the power control device comprising:
   a power accumulator configured to accumulate a part of power from the power source;
   a first voltage converter configured to receive power from the power source and the power accumulator, perform voltage conversion to a first target voltage, and supply power with the first target voltage to a first load;
   a second voltage converter configured to receive power from the first voltage converter, perform voltage conversion to a second target voltage, and supply power with the second target voltage to a second load;
   a power source monitor configured to monitor power from the power source; and
   a power controller configured to lower the first target voltage to a level that the second voltage converter is capable of converting to the second target voltage when the power source monitor detects that the supply of power from the power source has stopped.

2. The power control device of claim 1 further comprising a receiver configured to receive specification of a voltage, wherein
   when the power source monitor detects that the supply of power from the power source has stopped, the power controller lowers the first target voltage to the voltage whose specification is received by the receiver.

3. The power control device of claim 1, wherein
   when the power source monitor detects that the supply of power from the power source has stopped, the power controller lowers the first target voltage to a predetermined level.

4. The power control device of claim 1 further comprising a prohibitor configured to prohibit the power controller to lower the first target voltage until a predetermined amount of time required for the power source monitor to detect that the supply of power from the power source has stopped elapses.

5. The power control device of claim 1 further comprising a third voltage converter configured to receive power from the first voltage converter, perform voltage conversion to a third target voltage differing from the second target voltage, and supply power with the third target voltage to a third load, wherein when the power source monitor detects that the supply of power from the power source has stopped, the power controller lowers the first target voltage to a level that the third voltage converter is not capable of converting to the third target voltage.

6. The power control device of claim 1, wherein the power controller restores the first target voltage to an initial level before the lowering when the power source monitor detects that the supply of power from has restarted after having stopped.

7. An image forming device comprising:
a power control device configured to receive supply of power from a power source, perform voltage conversion, and supply loads with power, the power control device comprising:
 a power accumulator configured to accumulate a part of power from the power source;
 a first voltage converter configured to receive power from the power source and the power accumulator, perform voltage conversion to a first target voltage, and supply power with the first target voltage to a first load;
 a second voltage converter configured to receive power from the first voltage converter, perform voltage conversion to a second target voltage, and supply power with the second target voltage to a second load;
 a power source monitor configured to monitor power from the power source; and
 a power controller configured to lower the first target voltage to a level that the second voltage converter is capable of converting to the second target voltage when the power source monitor detects that the supply of power from the power source has stopped;
a volatile memory;
a writable non-volatile memory;
an evacuator configured to evacuate at least some data stored in the volatile memory to the writable non-volatile memory when the power source monitor detects that the supply of power from the power source has stopped, wherein
the second load includes a plurality of loads, one of which is the volatile memory.

8. The image forming device of claim 7, wherein the writable non-volatile memory is a hard disk.

9. The image forming device of claim 7 further comprising
 a stopper configured to stop the supply of power from the first voltage converter to the first load when the power source monitor detects that the supply of power from the power source has stopped, wherein
the first load is a load related to a drive system of the image forming device.

10. The image forming device of claim 7, wherein
the power controller lowers the first target voltage to a level that the second voltage converter is capable of converting to the second target voltage when the first load stops operating, in addition to when the power source monitor detects that the supply of power from the power source has stopped, and
the first load is a load related to a drive system of the image forming device.

11. An image forming device comprising:
a power control device configured to receive supply of power from a power source, perform voltage conversion, and supply loads with power, the power control device comprising:
 a power accumulator configured to accumulate a part of power from the power supply;
 a first voltage converter configured to receive power from the power source and the power accumulator, perform voltage conversion to a first target voltage, and supply power with the first target voltage to a first load;
 a second voltage converter configured to receive power from the first voltage converter, perform voltage conversion to a second target voltage, and supply power with the second target voltage to a second load;
 a power source monitor configured to monitor power from the power source;
 a power controller configured to lower the first target voltage to a level the second voltage converter is capable of converting to the second target voltage when the power source monitor detects that the supply of power from the power source has stopped; and
 a receiver configured to receive specification of a voltage;
a volatile memory;
a writable non-volatile memory;
a voltage specifier configured to issue the specification of a voltage in accordance with a power consumption state of the image forming device, when the power source monitor detects that the supply of power from the power source has stopped;
an evacuator configured to evacuate at least some data stored in the volatile memory to the writable non-volatile memory when the power source monitor detects that the supply of power from the power source has stopped, wherein
when the power source monitor detects that the supply of power from the power source has stopped, the power controller lowers the first target voltage to the voltage whose specification is received by the receiver, and
the second load includes a plurality of loads, one of which is the volatile memory.

12. The image forming device of claim 11, wherein
the power controller lowers the first target voltage to a level that the second voltage converter is capable of converting to the second target voltage when the first load stops operating, in addition to when the power source monitor detects that the supply of power from the power source has stopped, and
the first load is a load related to a drive system of the image forming device.

* * * * *